A. ANDRÉN.
ELEVATOR SIGNAL.
APPLICATION FILED APR. 19, 1909. RENEWED DEC. 3, 1917.

1,276,158.

Patented Aug. 20, 1918.
7 SHEETS—SHEET 5.

UNITED STATES PATENT OFFICE.

AUGUST ANDRÉN, OF BROOKLYN, NEW YORK, ASSIGNOR, BY MESNE ASSIGNMENTS, TO ELEVATOR SUPPLY & REPAIR COMPANY, OF NEW YORK, N. Y., A CORPORATION OF ILLINOIS.

ELEVATOR-SIGNAL.

1,276,158.   Specification of Letters Patent.   Patented Aug. 20, 1918.

Application filed April 19, 1909, Serial No. 490,837. Renewed December 3, 1917. Serial No. 205,248.

*To all whom it may concern:*

Be it known that I, AUGUST ANDRÉN, a subject of the King of Sweden, residing in Brooklyn, in the county of Kings and State of New York, have invented a new and useful Improvement in Elevator-Signals, of which the following is a specification.

My invention relates to an improved elevator signaling apparatus, and the principal object is to provide means for closer cooperation between the "starter" and the several operators of the elevator cars.

Another object is to provide means for informing the "starter" or "despatcher", as the main floor attendant will be termed hereinafter, where passengers are waiting on the other floors, and the direction they desire to go.

A further object is to provide means to enable the despatcher to signal any or all of the elevator operators; and also means to enable the operators to signal the despatcher.

A still further object is to provide means for cutting out the floor signaling function, either by the car operator or the despatcher, and means for restoring the floor signal function at any time by the same person, and means for automatically restoring the same at the end of a round trip.

For the attainment of these ends and the accomplishment of other new and useful objects, my invention consists in the features of novelty in the combination and arrangement as hereinafter more completely described, the novel combinations being set forth in the appended claims.

The efficiency of an installation of a number of elevators for parallel service depends to a great extent upon the coöperation of the several units, and may be appreciably increased by concentrating the service where it is most needed. The means employed at present for directing the elevator operators are: signals from waiting passengers; verbal instructions from passengers and the starter; and means, recently devised, for interrupting the run of an elevator and cutting out the floor signals for the same.

In order to provide for closer coöperation between the despatcher and the several operators, certain new devices are employed in the present embodiment in connection with the now-existing elevator signal devices, to enable the despatcher to exercise absolute control of the operators' work at any and all times, and also to inform the despatcher of the locality of the demand on the elevator service. The existing signal devices shown are modifications of the well known flash signal system, and the new devices comprise a system of transmitting signals between the despatcher and the car operators, in combination with auxiliary devices for the despatcher's information. An elevator signal system when equipped with these new devices will hereinafter be referred to as a "despatch system".

In the accompanying drawings.

Figure 1:
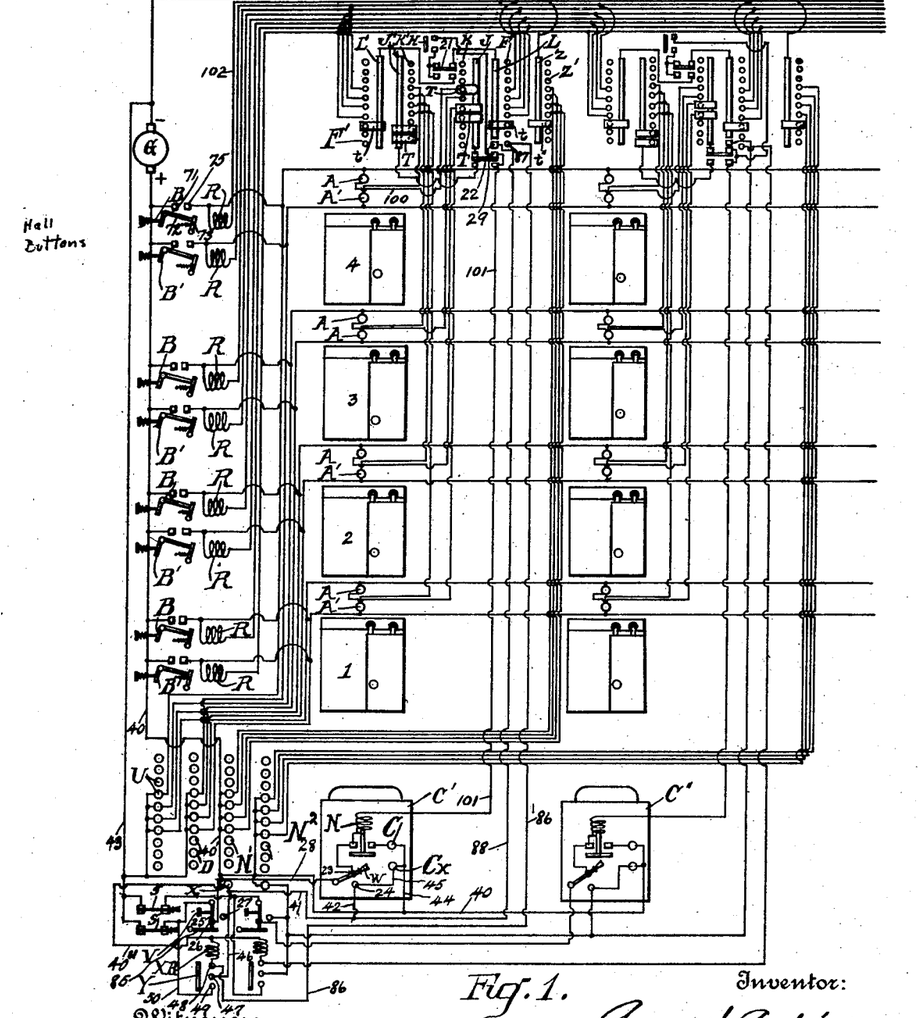
Figure 1 is a schematic arrangement of my despatch system as applied to a parallel installation of two elevators.

Referring to Fig. 1, the diagram shows the wiring for four floors of my electric signal system for two elevators; 1, 2, 3, 4 represent the doors in the elevator hatchway inclosures at four successive floors. A pair of push button switches is shown for each floor, one "up" switch B, and one "down" switch B'. The floor signal lamps A and A' are also arranged in pairs for each elevator on each floor. These signal lamps A and A' are for signaling a waiting passenger that a car is approaching, and are preferably of a different color to enable one to distinguish at a glance the direction of an approaching car.

Figures 7, 8, 9, 10, 11:
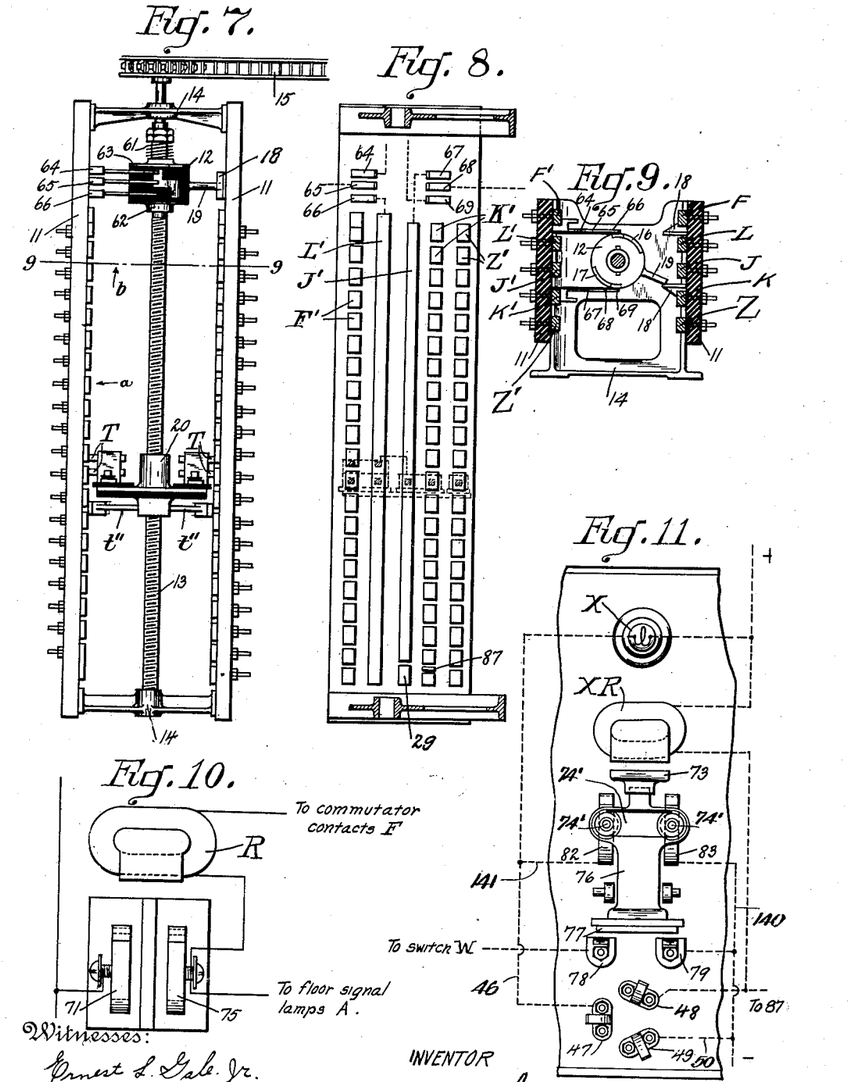
Fig. 7 is a plan view of the commutator device.
Fig. 8 is an elevation of the same looking from the inside in the direction of arrow A, Fig. 7, showing the electrical contacts and connections.
Fig. 9 is a detail cross sectional view of the commutator device through line 9—9 of Fig. 7 looking in the direction of the arrow b.
Fig. 10 is a front view of one of the magnets and contacts of Fig. 3 showing the electrical connections.
Fig. 11 is a detail front view of one of the magnets and contacts shown in Fig. 4.

The commutator device, which is shown more in detail in Figs. 7, 8, 9, comprises two sets of contacts; the right hand set J, F, L, and K (Fig. 1) for the ascending movement of the elevator car, and the left hand set J', F', L', K' for the descending movement thereof. The insulating frame 11 which supports these contacts is provided with bearings 14, in which the threaded rod or shaft 13 is adapted to rotate. The chain 15, or some suitable mechanism, imparts a rotary motion to the shaft or rod 13, and the nut or carrier 20, which does not rotate, is caused to travel along the said rod in accordance with the motion of the elevator car. The contacts T and t are suitably insulated and held by the moving carrier 20 to make electrical connections between the various fixed strip contacts J, I' and L, L', and the floor contacts F, F' and K, K'.

The drum 12, (Figs. 7 and 9) which carries the similarly shaped contacts 16 and 17, is loosely mounted upon the shaft 13 and pressed by a coil spring 61 between the friction disks 62 and 63 which are secured to the rotary shaft 13. A projection 19 on the drum 12 and corresponding stops 18 are provided to limit the movement of the drum in either direction. Six contact brushes 64, 65, 66, 67, 68 and 69 are arranged in two sets of three brushes, to make such connections with the contacts 16 and 17 as to constitute the mechanical equivalent of two single-pole double-throw knife switches; the switches 21, 22 shown in the schematic arrangement of Fig. 1, represent this equivalent. Since the chain 15 moves in accordance with the elevator car, a slight rotation of the shaft 13 in either direction will also rotate the drum 12 until it is stopped by the engagement of the projection 19 with one of the stops 18, and thus automatically changes the connections of the switches 21, 22 to the "up" or "down" position corresponding to the motion of the car.

The contact strip Z and the contacts Z' are also mounted in the frame 11. An insulated movable contact $t''$ is suitably held by the carrier 20 to make connections between the contacts Z and Z'. The contacts Z' correspond to each floor landing of the elevator installation and are suitably connected with the corresponding signal lamps N', N'', etc., upon the despatcher's board to indicate the position of the car, in the well known manner.

An electric generator G from which extend the positive and negative wires designated + and — respectively, supplies current for the signaling apparatus. When a push button switch B or B' is operated by an intending passenger at a floor landing the commutator device operates automatically as the car approaches, to light the corresponding signal lamp A or A' and signal the approach of the car, and at the same time the passengers' stop signal lamp C is lighted in the car for the operator. For example, if a prospective passenger at the fourth floor operates the push button switch B, the contact bar 72 is moved into position to bridge the contacts 71, 75 and is held in such position by the latch 73 as more fully described hereinafter. As the car nears the fourth floor the contact T of the commutator device completes a circuit which may be traced from the positive side of the generator G through push button switch B, floor signal lamp A, wire 100, contacts T, J, 22, wire 101, magnet N in the car, switch W, conductor 28, switches 25 and S to the minus wire 43, and thence to the negative side of the generator. As this circuit is through the signal lamp A, the latter will be lighted to signal the approach of the car. At the same time the magnet N closes its switch and completes a circuit through the passengers' stop signal lamp C in the car as follows: from the generator, through the positive wires 40, 40', 44, signal lamp C, switch of magnet N, switch W, conductor 28, switches 25 and S to the minus wire 43. The lamp C is therefore lighted to notify the operator of the waiting passenger.

The push-button switches B, B', are electrically connected to the annunciator signal lamps U and D, so that whenever an intending passenger presses a button B or B' for the purpose of signaling a car to stop, the corresponding signal lamp U or D in the despatcher's annunciator board will be lighted. This signal lamp U or D will remain lighted until the passengers' signal has received attention, and will not only inform the despatcher of where there is a demand for service, but also at what rate that demand is being supplied.

Figure 12:
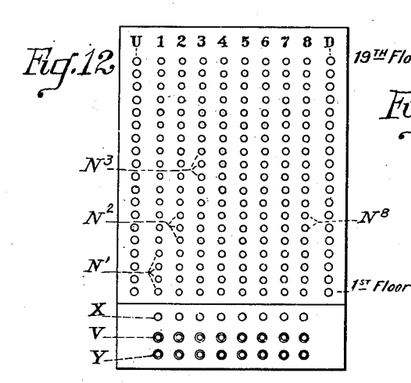
Fig. 12 is a front view of a despatcher's electrical indicator and annunciator board for showing the locations of the elevator cars and the presence of passengers on the various floors together with the despatcher's signaling board.

The indicator lamps N', N², N³ and the annunciator lamps U and D are shown in Fig. 12, mounted on a board above the despatcher's control apparatus or "despatchboard". In this view columns of signal lamps N', N'', etc., are shown for an installation of eight different elevators, the circuits for two of such elevators being shown in Figs. 1 and 2. From these signals the despatcher can determine, at any and all times, where the various elevator cars are located, and where there are waiting passengers. The lower part of Fig. 12 shows the despatcher's signaling apparatus for an installation of eight elevators consisting of two push buttons V and Y for each elevator, and a signal lamp X, for transmitting and receiving signals between the despatcher and the car operator. The component parts of this signal apparatus, by means of which the elevator car operator and the despatcher send and receive independent signals are: the despatcher's switch 25 (Fig. 1) closed by means of the push-button V and restored by means of the restoring magnet XR; the despatcher's switch comprising the push-button Y and contacts 47, 48, 49; the despatcher's signal lamp X; the car operator's signal lamp Cx and switch W. By pressing this button Y corresponding to car C', the despatcher energizes the Cx signal in the car C', and a duplicate signal appears upon the despatcher's board in the signal lamp X for the despatcher's verification, and any order may be transmitted to the car operator, according to a prearranged code.

Figure 18:
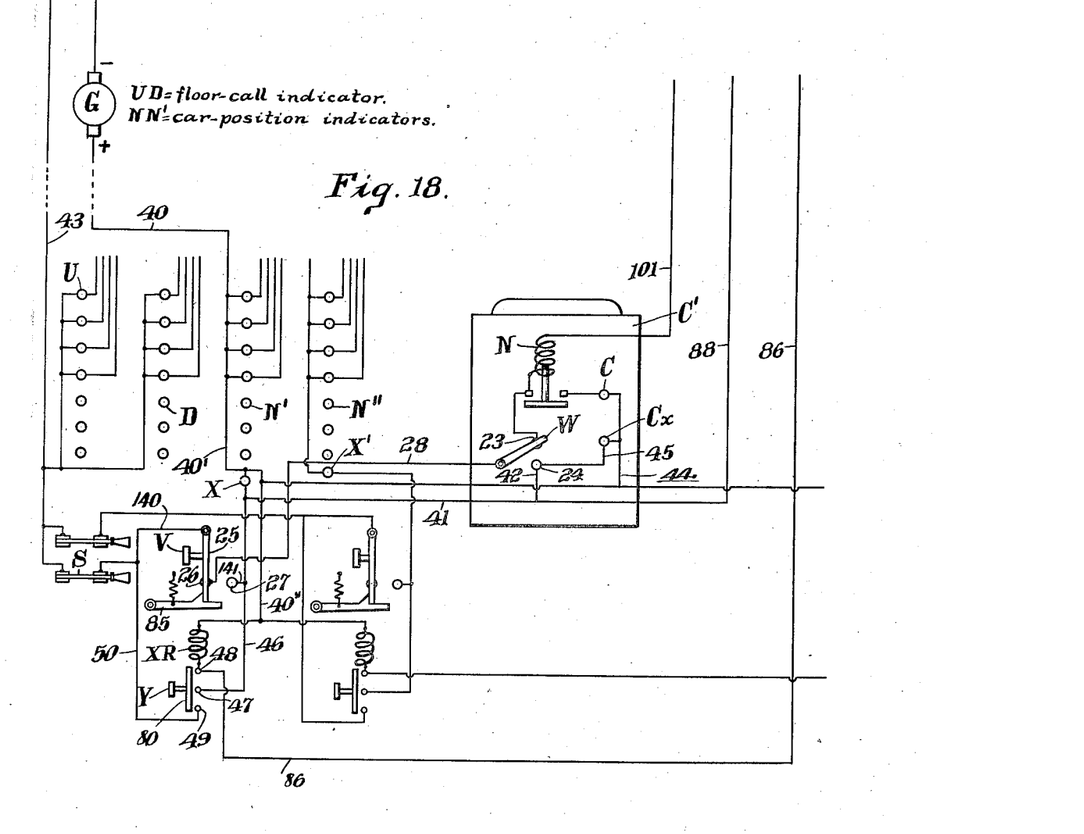
Fig. 18 is a view showing the signaling apparatus in the car and at the despatcher's station and the circuit connections, the arrangement being substantially like that shown in Fig. 1, but on a larger scale.

When the despatcher wishes to order an express run, the push-button V is pressed, thereby moving the arm 25 from the contact 26 to the contact 27 where it is held by latch 85 (Figs. 1 and 18). A circuit is thereby closed to the car express-signal lamp Cx which will become lighted and remain lighted until restored by the energization of the restoring magnet XR which withdraws the holding latch 85. A duplicate signal appears on the despatch-board at X for the despatcher's verification and also for record. The circuit through the common wire 28 being broken, the magnet N, in the car cannot become energized, and the car stop signal lamp C as well as the floor signal lamps A, A' will not light up when an express car passes any given floors until the express signal in the car is annulled, and the floor signaling feature is restored by the despatcher in pressing the button Y and thereby energizing the restoring magnet XR.

The floor signaling function of the system is also restored automatically at the end of a round trip by means of a shunt contact 29 on the commutating device, arranged to energize the restoring magnet XR when the elevator is between the first and second floors going down. The circuit through the restoring magnet XR when the elevator car is in this position is as follows: through the plus wires 40, 40', 40'', magnet XR, conductor 86, contacts 87, t, 29, conductors 88, 41, contact 27, switches 25, S and minus wire 43.

In case the elevator operator wishes to prevent the passengers' floor signals A or A' from lighting, because of his desire to pass a floor without stopping, the car switch W may be operated. By moving the said switch W from its normal position on contact 23 to contact 24, the common wire connection to the floor signals A or A' is broken and the despatcher's express signal lamp X is lighted to inform the despatcher of the operator's intention. At the same time, the car signal lamp Cx is also lighted for the car operator's verification and record. Short signals may be sent to the despatcher by this means from each floor, according to any prearranged code.

Figure 15:
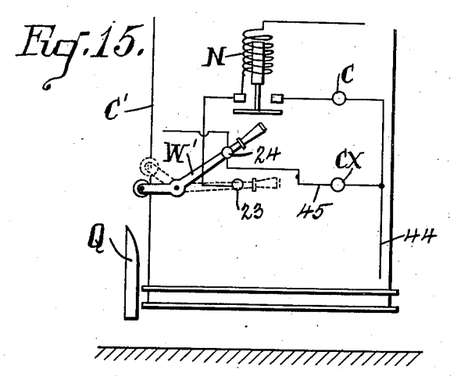
Figs. 15, 16 and 17 show modifications of the elevator car operator's signaling device.
Figure 16:
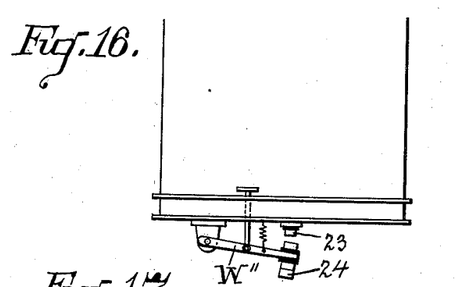

Modifications of the car switch W are shown by Figs. 15 and 16. In the former, the switch W' is formed with a projecting arm which is engaged by a cam Q to return the switch to its normal position when the elevator-car nears a predetermined position such, for instance, as the bottom landing. In Fig. 16 the foot-lever in the car is attached to the switch W'', which is returned by a spring as soon as the pressure on the said lever is removed. The arrangement of the switch W in the elevator car as shown in Fig. 1 is preferable for the sake of simplicity.

The circuit for the restoring magnets R may be used with the common wire circuit normally closed and arranged to be broken when the floor signaling function is cut out by the car operator or the despatcher, but it is preferable to employ this circuit normally open as in Fig. 1, and closed by means of the centrifugal governor switch H, and by the method of "selective restoration" as described and explained in my Patent No. 1,109,950, September 8, 1914, for "signaling apparatus." This method of "selective restoration" consists in maintaining the switch H normally open until the stop signal receives operative attention from an operator in one of the elevator cars. This attention preferably consists in the act of stopping the elevator car to receive the passenger. A centrifugal speed device is employed to close the restoring switch H when the speed of a car falls below a certain minimum, and the restoring magnet R for the operated push-button is thereby energized to return the push-button switch to its unoperated position. A circuit for the restoring magnet R of the push button B at the fourth floor, for example, may be traced through the restoring switch H as follows: from the plus wire 40, through push button switch B, restoring magnet R, conductor 102, contacts $t$, L, 21, switch H, conductor 101, magnet N, switch W, conductor 28, switches 25, S and minus wire 43. The knife-switches S are provided for cutting out the entire signaling system of any elevator car not in operation or of a car in use for other than passenger service.

Figures 3, 4, 19, 20:
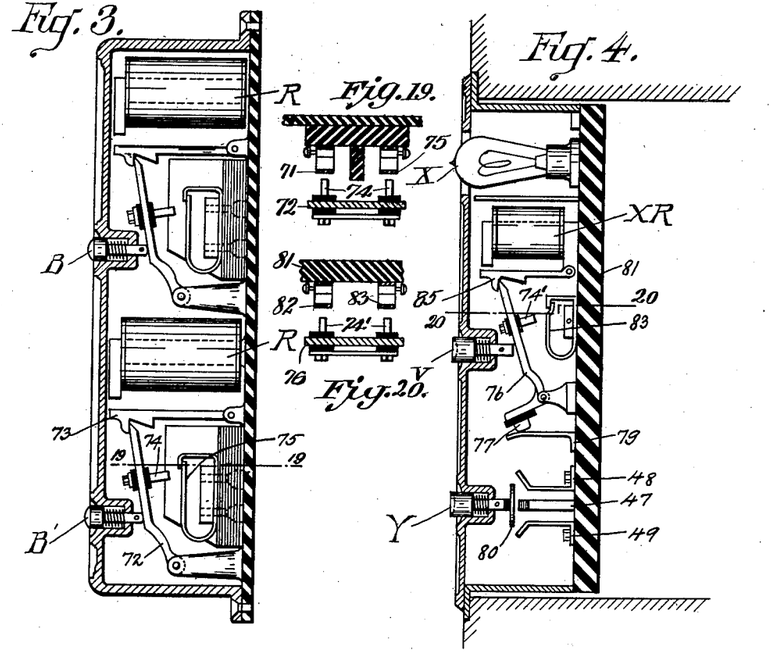
Fig. 3 is a side elevation partly in section of the form of a passengers' floor push button switch preferably used in the arrangement of circuits shown in Fig. 1.
Fig. 4 is a similar view of the despatchers' signal board.
Fig. 19 is a detail section through line 19—19 of Fig. 3.
Fig. 20 is a detail section through line 20—20 of Fig. 4.

Fig. 3 shows a side elevation of two passengers' floor push-button switches as installed at each floor landing, the switch marked B for up-going signals and the switch marked B' for down-going signals. The push button B' engages a lever 72 carrying two insulated contacts 74 which are electrically connected and arranged to engage the spring contacts 71 and 75 (Figs. 10 and 19). Pressing the button B' causes connections to be made between contacts 71 and 75. A latch 73 similar in function to the latch 85 diagrammatically shown in Figs. 1 and 18 maintains the lever 72 in active position after the push-button B' is operated, until the restoring magnet R is energized, when the latch 73 is lifted and the lever 72 returned to its original position by gravity and the pressure from the compressed spring contacts 71 and 75, thus breaking the connection between these spring contacts.

Fig. 4 shows a side elevation of the despatcher's signal board, and Fig. 11 shows a detailed front view of the same, with the various electrical connections thereto. The despatcher's signal lamp X is mounted on the insulating board 81. The push-button V engages a lever 76 which carries an insulated contact piece 77, and this contact piece 77 is adapted to make electrical connection between the contacts 78 and 79 (Figs. 11 and 20). The contact 77 performs the same service as lever 25 (Fig. 1) of closing the common wire of the floor-signal lamps A, A'. By pressing the push-button V, the lower end of the lever 76 is forced outward and the contact piece 77 carried thereby breaks connection between the contacts 78 and 79 (Figs. 11 and 20). The same operation also makes electrical connection between spring contacts 82 and 83 by means of insulated bridge 74' in the same manner described for contacts 71 and 75 and the push-button B'. The contacts 82 and 83 close circuits through the signal lamps $Cx$ and X from minus line 140 to plus line 141 (Figs. 11, 18). By pressing the button Y (Fig. 4) the insulated contact piece 80 is pressed against the contacts 47, 48, and 49, thereby closing a circuit through the restoring magnet XR, which attracts the latch 73 and releases the lever 76, thereby breaking the circuits through the X and $Cx$ signal lamps by way of the lines 140, 141 above described, and restoring the circuit connections between contacts 78 and 79. The closing of contacts 47 and 49 by this contact piece 80 also makes a separate circuit through the signal lamps X and $Cx$ by way of plus line 46 and minus line 50. The push-button Y is also employed for transmitting intermittent signals as previously described.

In the accompanying drawings, two elevator cars are shown in juxtaposition, each car being provided with a separate commutator device. The commutator device for each car will be substantially the same, and these devices, together with the various releasing and restoring magnets, may be placed in any convenient or suitable location. It is not deemed necessary to describe all the component parts and circuits in accurate detail, since much of the arrangement is similar to that already known by those familiar with the art.

Figure 2:
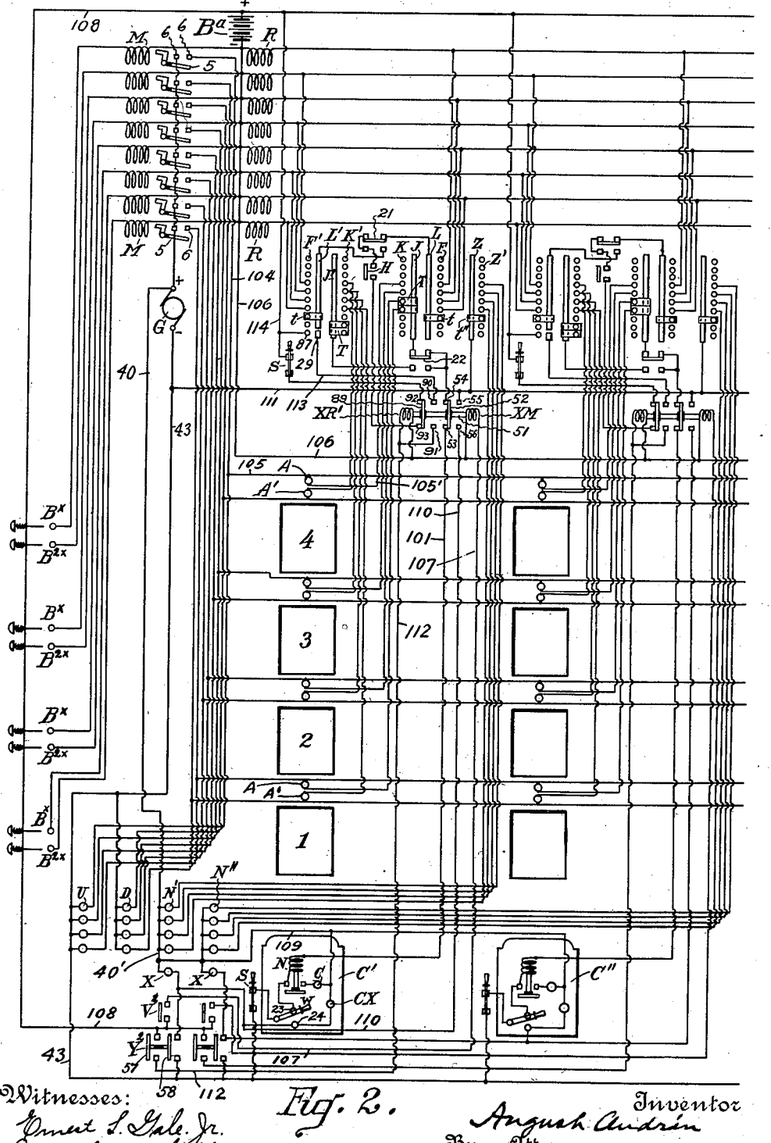
Fig. 2 is a similar arrangement of the same including a separate source of current supply for operating the relays and modified forms of switch devices.

Fig. 2 shows a modification of the system and arrangement of Fig. 1, in which the operation is substantially the same, with the difference that an auxiliary source of current supply $B^a$ is employed to furnish current for the principal relay magnets and these relay magnets for the floor-switches and the despatcher's signal switches are grouped in the same place and operated from a distance, by the passengers' floor push-buttons $B^x$, $B^{2x}$, and the despatcher's signaling switches $V^2$ and $Y^2$ respectively.

When a push-button switch $B^x$ or $B^{2x}$ is pressed, the corresponding magnet M is energized from the source of energy $Ba$; this causes the contact 5 to make electrical connection between the contacts 6, and to light the despatcher's annunciator lamp U or D in the ordinary way. The commutating device and the floor-signals A, A' are the same as shown in Fig. 1, and the restoring magnet R is operative to return the contact member 5 to its inactive position, as shown, after the operation of the restoring switch H by the method of "selective restoration," previously explained.

If for example, the push button $B^x$ at the fourth floor be operated, the uppermost magnet M (Fig. 2) will lift its contact 5 into engagement with the contacts 6 and establish a circuit from the plus side of the generator G through said contacts 5, 6, wires 104, 105, signal lamp A, wire 105', contacts T, J, 22, 54, 52, 53, conductor 101, magnet N, switches W, S and — wire 43.

The modification in Fig. 2 comprises an express magnet XM and a restoring magnet XR' provided with a common core 51 or connected cores carrying contact bars 52 and 89. When the magnet XM is energized these contact bars 52 and 89 are carried to the right and engage respectively the contacts 55, 56 and 90, 91. When the magnet XR' is energized the contact bars 52 and 89 engage respectively the contacts 54, 53 and 92, 93. If the despatcher's push button V² is operated to indicate to the car operator an express run, a circuit will be completed through the express magnet XM which may be traced from the battery B<sup>a</sup> through conductor 106, magnet XM, conductor 107, switch V² and conductor 108 back to the battery. The magnet XM being thus energized operates to break the circuit for the floor signal lamps AA' and the magnet N. Passengers at the floor landings therefore can not operate the signals. The operation of the express magnet XM also establishes a circuit for the car operator's signal lamp CX. This circuit is through the generator G and may be traced through the plus wires 40, 40', 109, lamp CX, conductor 110, contacts 56, 52, 55, wire 111, and back to the generator. The signal lamp CX is thus lighted to indicate to the car operator an express run. A circuit is also completed through the despatcher's lamp X in shunt or parallel to the lamp CX between the wires 110 and 40'. The lamps CX and X will remain lighted until the restoring magnet XR' is energized.

The push button switch Y² similar in function to switch Y of Fig. 1 comprises two insulated contact members 57 and 58. When the despatcher operates the switch Y², the contact member 57 completes a circuit for the restoring magnet XR' as follows: from the battery B<sup>a</sup> through the wire 106, magnet XR', wire 112, contact member 57, and wire 108. The restoring magnet XR' being thus energized moves the contact bars 52 and 89 to the left, thereby restoring the circuit for the floor signal lamps A, A' and the car signal lamp C', and also opening the circuit above traced for the lamps CX and X. The contact member 58 of the switch Y², however, maintains circuits for the lamps CX and X independently of the restoring magnet as long as the switch Y² remains closed. That is, the plus wires 40' and 109 lead to one side of the lamps X and CX, and the opposite sides of said lamps are connected through the contact member 58 to the — wire 43. It will thus be seen that the switch Y² is adapted not only to operate the restoring magnet XR', but also to give the car operator any desired signals through the signal lamp CX in accordance with any prearranged signaling code. The purpose and operation of the switch W in the car (Fig. 2) are the same as set forth in connection with Fig. 1.

The automatic restoration of the signaling circuits after an express run is effected in a manner similar to that elsewhere set forth in connection with Fig. 1. That is, as the descending car nears the end of its run, the contact t of the commutator completes a circuit through the restoring magnet XR' (Fig. 2) as follows: from the battery B<sup>a</sup> through the conductor 106, magnet XR', contacts 91, 89, 90, conductor 113, contacts 29, t, 87 and conductor 114 back to the battery. The magnet XR' being thus energized operates to restore the signaling apparatus for local service as explained in connection with the closing of the switch Y².

Figure 17:
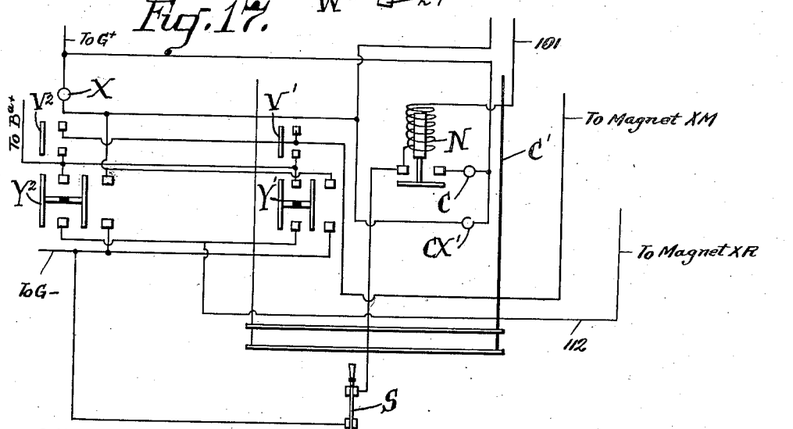

Fig. 17 shows the switch W of the elevator car eliminated and the push button switches V' Y' substituted in place thereof. In this modified construction the switches V² and Y² are used for operating the express magnets XM and restoring magnets XR' as in Fig. 2, and the switches V' and Y' for the car operator are connected in parallel with the despatcher's switches V² and Y² and operate the same as the latter. By the use of this construction the car operator may signal the despatcher by the operation of switch Y' either by a flash repeated or a continuous signal, without otherwise disturbing the signals received by his car from passengers waiting upon a floor. In other words, the car operator may thus signal the despatcher even when he does not wish to run his car express and in the same way that the despatcher may signal the car operator, so that the two may have an exchange of signals and transmission of information back and forth by means of any predetermined code.

Figures 5, 6:
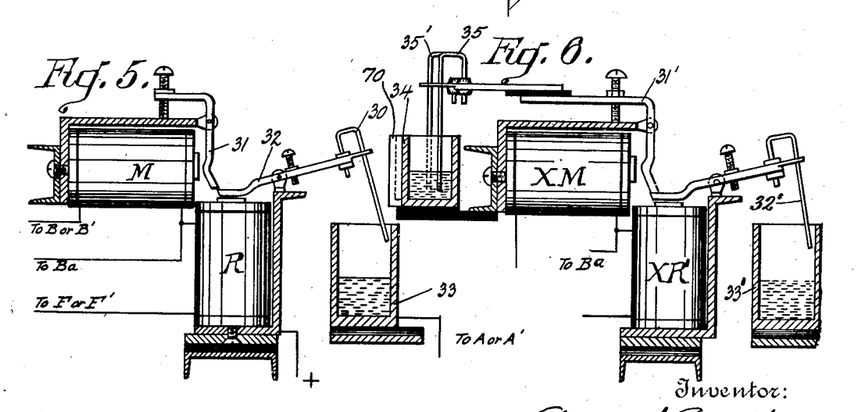
Fig. 5 is a detail view partly in sections, showing a "setting" and a "restoring" magnet and a mercury-pot contact such as may be used in connection with a push button switch in the arrangement shown in Fig. 2.
Fig. 6 is a detail side view partly in section of magnets and mercury-pot contacts such as may be used in connection with the separate despatchers' switches, as shown in the arrangement of Fig. 2.

Fig. 5 shows the type of magnets and mercury-pot contacts which may be used in connection with the floor push button switches B<sup>x</sup> and B<sup>2x</sup>. When the magnet M is energized, the movement of the armature 31 allows the contacts 30 to fall by gravity into the mercury-cup 33, and energizing the restoring magnet R, attracts the armature 32 and draws the contact 30 out of the mercury cup 33 to its initial position, as shown, where it is caught behind armature 31 until the next energization of magnet M.

The specific form of gravity switches and magnets which may be used in connection with the restoring magnet XR' and the express magnet XM is shown in Fig. 6, and they are similar in shape and operation to those shown in Fig. 5, with the added feature of two mercury contact cups 34 and 70, and the contact members 35, 35' which are attached to and insulated from the armature 31', and adapted to be used in connection with the said mercury contact cups 34 and 70. These two mercury cups 34 and 70, together with their coöperating contact members 35, 35' correspond to the separated contacts 92, 93 and 54, 53, which are closed by the energization of magnet XR′, and mercury cups 33′ are also provided in duplicate as shown in Fig. 6 with duplicate coöperating members 32′ to correspond with the contacts 90, 91 and 55, 56 of Fig. 2, which are closed by the energization of magnet XM. With this arrangement the restoring magnet XR′ is energized by the operation of the push-button Y² or by the electrical connection of the commutator device contacts 29 and 87 (Fig. 2) by the sliding contact $t$, which automatically closes a circuit through the restoring magnet XR′ at the end of a round trip of the elevator car.

Figure 13:
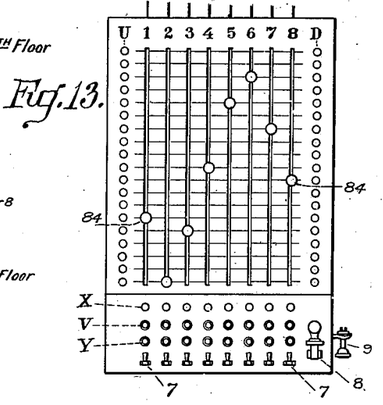
Fig. 13 is a front view of a combined mechanical indicator and electrical annunciator board, together with a despatcher's signaling board.

Fig. 13 shows a despatcher's board for an installation of eight elevators and with mechanical indicators for nineteen floors. The signal disks 84 are moved up or down by the elevator mechanism through mechanical connections, not shown, in accordance with the movement of the car in the well to show the positions of the several cars. The annunciator lamps U and D are lighted whenever intending passengers press the passengers' floor buttons, thus informing the despatcher of the locality and direction of demand for elevator service. The push buttons V and Y are the despatcher's signaling buttons, and the lamps X are the express signal lamps. Since this mechanical indicator when used will be substituted for the electrical indicator shown by Fig. 12, it is obvious that the contacts Z and Z′, described in connection with the commutator device, and shown by Figs. 1 and 2, will not be needed when the mechanical type of indicator is used.

Figure 14:
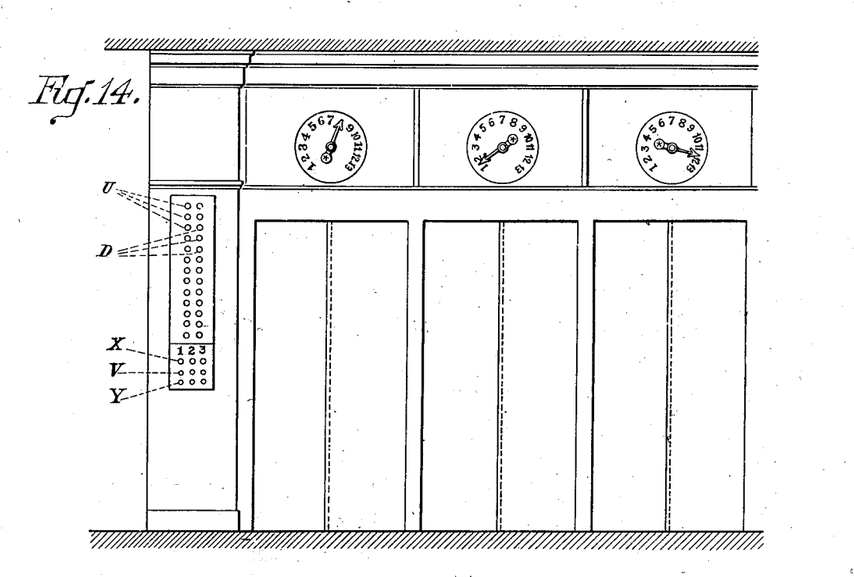
Fig. 14 is a view showing dial indicators over the elevator entrances for determining the positions of the various elevator cars, and a despatcher's annunciator and signaling board for use in directing the cars.

The well known form of mechanically operated dial indicators, as shown over the elevator entrances in Fig. 14, or other forms of indicators and also annunciators of various types may be used in conjunction with the despatcher's signaling devices in order to form the complete despatcher's controlling system. It is not deemed necessary to show the specific connections between the elevator cars and the mechanical indicators such as the dials of Fig. 14 or the sliding disks of Fig. 14, as such connections are well known to those familiar with this art. The combination of these signaling devices consisting of the indicator, the annunciator, and the mutual signal devices for despatcher and operator in such a manner as to come under the immediate observation and control of the dispatcher, constitutes a principal new feature of my despatch system, and it enables the despatcher to exercise absolute supervision and control of the service of the several elevators, at any and all times, as well as to eliminate misleading signals which are characteristic of previously existing signal systems.

The art of mutually transmitting and receiving signals by the car operator and the despatcher, may be amplified where conditions warrant, but in practice, the arrangement as shown is preferable, because of its simplicity. The despatcher's board shown by Fig. 13 is provided with an auxiliary equipment of telephones which might be included for slower and more minute communications; ringing keys 7 are shown for each elevator car, a transmitter 8 and a receiver 9. The wiring connections for the telephone and ringing keys need not be specifically shown as these may be similar to that of any well known telephone equipment, it being understood that an ordinary telephone connection is maintained between the despatcher's board and each of the running elevators, a separate key of the row 7 being provided for connecting the despatcher with any one elevator by an ordinary switchboard system familiar to those skilled in the telephone art.

In order however, that the operation of my invention may be more readily understood, a supposed operation will be described. Referring to Fig. 1, let it be assumed that the elevator car C′ is moving upward; then the up-and-down directional switches 21 22 will be automatically connected to the "up" contacts as shown, by the commutating device. If a person on the floor marked 3 pushes the "up" push-button switch B the corresponding annunciator lamp U in the despatcher's board, is lighted, informing the despatcher of the call. When the car C′ is running in the ordinary way to receive passengers, the passengers' floor signal lamp A at the floor 3, and the car operator's signal lamp C will be lighted as the "up" traveling car C′ approaches the said floor. In bringing the car to a stop, an automatic speed device will operate to close the switch H by my method of "selective restoration", previously referred to, and the commutating device contact $t$ closes a circuit through the contacts F and L, thereby completing a circuit through the restoring magnet R, which returns the operated floor switch B to its normal position, and by such return breaks the circuit through lighted floor signal lamp A and the indicator lamp U. When the car is again started, the automatic speed device restores the switch H to its normal "open" position.

In case the elevator operator deems it advisable not to stop to receive more passengers, or for any other reason, he may signal the despatcher by the operation of the car switch W. When this switch is turned to the contact 24, circuits are closed to light the despatcher's signal lamp X and the car lamp Cx. These circuits may be traced from the positive (+) main 40 of the generator G, representing the source of current supply, through the signal lamp X, wires 41, 42, contact 24, switch W, wire 28, contact 26, arm 130

25, thence through the corresponding switch S to the negative (—) main 43; and also from the main 40, through wire 44, lamp Cx, wire 45, contact 24, and switch W to the negative main 43 as before. By means of this switch W, the elevator car operator may signal the despatcher as desired, according to any prearranged code, the car lamp Cx lighting for verification. The common circuit being broken when the switch W is moved from contact 23 to contact 24, the signal lamp C in the car, and the passengers' floor signal A will not be lighted when the car approaches a floor from which a signal has been sent by an intending passenger.

When the despatcher wishes to order an express run or the passing of a single floor or a number of floors by the car C' without the car signal lamp C and the floor lamps A lighting up, he presses the button V, thereby breaking the circuit from wire 28 to the negative main 43, and at the same time closing circuits which light the signal lamps X and Cx. It is evident that if the car lamp C does not light when the car approaches a floor, the operator will have no occasion to stop at a floor to receive passengers. If, instead of ordering an express run, the despatcher desires to transmit any other signal to the car operator, as for instance, to return to the ground floor after delivering the last passenger on an up trip, he may light the car lamp Cx by pressing the push button Y, thereby transmitting any desired message according to a prearranged code, the despatcher's signal lamp X also lighting simultaneously for verification. These intermittent signals do not interfere with the passengers' floor signals or with the stop signal C in the car, for the common wire circuit through wire 28 is not broken. When the push button Y is pressed, the signal lamp circuits may be traced as follows:—from the positive main 40 through lamp X to wire 46, and from positive main 40, wire 44, car lamp Cx, wire 45, contact 24, wires 42, 41 to wire 46; thence from wire 46, to contact 47, switch contact Y, contact 49, wire 50, switch S to the negative main 43. Thus it is seen that the lamps X and Cx are in parallel and will be lighted simultaneously.

If the despatcher wishes to interrupt an express run, he makes his desire known to the car operator by pressing the push button Y. This closes a circuit through the restoring magnet XR, and if the express switch V has been operated, the latch 85 is attracted by the XR magnet to release the contact arm 25 from the contact 27 and make contact with 26, thereby breaking the circuits to the X and Cx lamps, and restoring the signaling function of the car signal lamp C and the passengers' floor signals A or A'. The circuit of the restoring magnet XR may be traced as follows: from the positive main 40, through the restoring magnet XR, to contact 48, contact piece Y, contact 49, wire 50, switch S to the negative main 43.

Shunt contacts 29 and 87 on the commutating device cause the restoring magnet XR to be energized and the express signal to be automatically restored when the car is nearing the starting floor on its down trip. This circuit may be traced as follows: from the positive main 40 through the restoring magnet XR, contact 48, wire 86, contact 87, contact piece t, contact 29, wires 88, 41, 46, contact 27, contact arm 25, and switch S to the negative main 43.

It will be noted that any elevator passing a floor from which a signal has been sent to stop the car, does not prevent the car signal lamp in subsequent cars from lighting, thereby rendering it unnecessary for the waiting passengers to press the push-button after the passing of each car. When the passengers' signal receives the desired attention from a car operator, the floor signaling device is returned to its unoperated position by means of my system of "selective restoration".

The various kinds of signal lamps are preferably arranged to light with different color, to add distinction to the system and thus render the signals more rapidly and easily discernible.

It is evident from the description that the means which the despatcher employs for controlling the operation of the elevator car, comprising an annunciator, an indicator, and means for the mutual exchange of signals between the despatcher and the several operators, are equally applicable to other signal systems, and such improvement of any existing elevator signal system will greatly aid in rendering the best service to the passengers.

I desire not to be limited to the exact arrangement herein described, nor to the exact construction of the several parts illustrated and described in detail, for it is evident that changes may be made by those skilled in the art to conform with the exigencies of a particular installation, without interfering with the spirit and scope of my invention.

What I claim and desire to secure by Letters Patent of the United States, is:—

1. In an elevator signaling apparatus, the combination with elevator cars, of separate signal devices in the cars for receiving signals from a despatcher and an intending passenger, means whereby the despatcher may operate the despatcher signal, and means whereby one car operator can signal the despatcher his intention of passing any floor or floors without stopping.

2. In an elevator signaling apparatus, the combination with elevator cars, of a despatcher's signal station, passengers' floor signals, separate signal devices in the cars for receiving passengers' stop signals and despatcher's signals, means whereby the despatcher may operate the despatcher's signals, and means whereby one car operator may signal the despatcher his intention of passing a floor and also prevent the operation of the passengers' floor signal.

3. In an elevator signaling apparatus, the combination with elevator cars, of a despatcher's signal station, passengers' floor signals, separate signal devices for the cars for receiving passengers' signals, and despatcher's signals, and means whereby a car operator may prevent the operation of the floor signals and signal the despatcher, or the despatcher may operate the despatcher's signal for any particular car and also prevent the operation of a floor signal for that car at a given floor while permitting other cars to operate a signal at said floor.

4. In an elevator signaling apparatus, the combination with elevator cars, of a despatcher's signal station, separate signal devices in the cars for receiving passengers' signals and despatcher's signals, and means whereby the despatcher may set a signal in the car, means controlled by the movement of the car to automatically restore the signal, and means controlled by the despatcher to restore the signal.

5. In an elevator signaling system, the combination with elevator cars, of signaling means comprising a despatcher's signal board, a signal device in the car for informing the car operator at which floors to stop, a device at the despatcher's board for cutting out this signal in the car, and another car signal independent of said cutting out device which may also be operated from the despatch board as a flash, repeated, or continuous signal.

6. In an elevator signaling apparatus, the combination with elevator cars, of signaling means comprising a despatcher's signaling board, passengers' floor signals, separate signal devices in the cars for receiving passengers' stop signals and despatcher's signals, and means whereby a car operator may prevent the operation of the floor signals and the passengers' stop signal in the car and may signal the despatcher, or the despatcher may operate the despatcher's signal device.

7. In an elevator signaling system, the combination with elevator cars, of signaling means comprising a despatcher's signal board, signal devices in each car controlled from the despatch board, means for cutting out the signaling feature of one of said devices, and means for restoring this feature from the despatcher's signal board at any desired period in the travel of the car.

8. In an elevator signaling system, the combination with elevator cars, of signaling means comprising a despatcher's signal board, a signal device in the car for indicating when to stop the car, means for cutting out this stop-signaling feature either by the car operator or by the despatcher, and mechanically operable means for restoring this feature at any desired time before the end of the trip.

9. In elevator signaling apparatus, the combination with elevator cars, of signal elements in the cars, a despatch board comprising indicators to indicate the position of the cars, and annunciators to show the directional demand for elevator service, and means controlled from the despatch board for operating the signal elements in the cars to transmit orders to the operators thereof.

10. In elevator signaling apparatus, the combination with elevator cars, of signal elements in the cars, a despatch board comprising indicators for indicating the position of the cars, and annunciators for showing the demand for elevator service, and an express signal element for each elevator car, means for operating the car signal elements from the despatch board, and means for also operating the express signal element for verifying a message sent to a car.

11. In electric elevator signal apparatus, the combination with elevator cars, of a passenger's stop signal and a despatcher's signal in each car, signal switches operable from the floors to effect the operation of said stop-signals, a despatch board comprising visual indicators indicating the positions of the cars, signals indicating the operation of said signal switches, and switches for closing circuits to the despatcher's signals in the cars to indicate express runs.

12. In electric signaling apparatus for elevators, the combination with elevator cars, of a passenger's stop signal element and a despatcher's signal element in each car, a despatch board with switches having circuit connections to said despatcher's signal elements for transmitting signals to the elevator car operator, and additional switches at the despatcher's board having circuit connections for controlling the operation of the stop signal elements.

13. In electric signaling apparatus for elevators, the combination with elevator cars, of signaling means comprising a stop signal element, and a despatcher's signal element in each car, a switch for preventing the operating of the stop signal element in a car, a separate switch and means by which the despatcher's signal element in the car is operated independently of the stop signal element when said second switch is operated.

14. In electric signaling apparatus for elevators, the combination with elevator cars, of a stop-signal element and a despatcher's signal element in each car, automatic means for operating the stop-signal element in the car when the car approaches a floor from which a signal has been caused to appear, a despatch board provided with switches, connections whereby the operation of one of the said switches will prevent the stop-signal element in the car from operating, and means whereby the operation of another of said switches will operate the despatcher's signal element without opening the circuit of the stop signal element.

15. In an elevator signaling system, the combination with a movable car, of passenger's floor-signals for indicating the approach of the car to a given floor, a despatcher's signal board, means for signaling to the operator from a given floor the intending passengers' desire for the car to stop at that floor, and annunciator signals appearing on the despatcher's board to show from which floors the stop signals are sent.

16. In an elevator signaling system, the combination with a movable car, of passengers' floor signals for indicating the approach of a car to any certain floor and the direction of motion of the car, means for signaling to the car operator from a given floor the intending passenger's desire for the car to stop at that floor, a despatcher's signal board, and annunciator signals which appear on the said board to show from which floors the stop signals are sent and the desired direction of travel of the intending passengers.

17. The combination with several elevators arranged for parallel service, of signals and signaling devices in the cars, a supervisory station comprising indicators for showing the position of the cars, and annunciators for indicating the demand for elevator service at the several floors, and signal sending and signal receiving devices for sending and receiving signals to and from the cars.

18. In electric signaling apparatus for elevators, the combination with elevator cars, of a stop signal element and a despatcher's signal element in each car, circuits for said elements, a despatch board provided with switches, and means whereby the operation of one of the said switches will cause the despatcher's signal element in the corresponding car to be operated, the circuit of the stop signal element remaining intact.

19. In electric signaling apparatus for elevators, the combination with elevator cars, of signaling means comprising a stop signal element in each car, means for controlling the operating of the stop signal element in the car from any floor as the car approaches the said floor, a despatch board provided with switches, one of said switches being operative to prevent the operating of the car stop signal element, and means controlled by another of said switches to restore the stop-signal operating feature prevented by the operation of the first named switch.

20. In electrical signaling apparatus for elevators, the combination with elevator cars, of signaling means comprising a stop signal element and a despatcher's signal element in each car, means for automatically operating the stop signal element in the car, a despatch board provided with switches, one of said switches being operative to prevent operation of the car stop signal element, and means controlled by the other switch to restore the first switch to its normal position and also for operating the despatcher's signal element in the said car.

21. In electric signaling apparatus for elevators, the combination with elevator cars, of signaling means comprising signal controlling devices at each floor, a despatch board with signal sending and receiving devices, separate signal devices in each car for receiving signals from a floor controlling device and from the despatch board, and means for controlling the operation of the floor signaling devices from the despatch board.

22. In electric signaling apparatus for elevators, the combination with elevator cars, of a stop signal element in each car, a circuit for said stop signal element, means for operating the said stop signal element, a switch in each car controlling the stop signal element circuit and operated to prevent the operation of said stop signal element and means for informing the despatcher of the operation of the said switch.

23. In an elevator signaling apparatus in combination, a plurality of cars, signals for the cars to stop at the floors, up and down signaling means corresponding to each floor and operated by the intending passengers for initiating up and down calls, a despatcher's station having for each car means controlled by the movement of that car only and indicating the position and direction of movement of that car together with an up and a down indicator corresponding to each floor and each displayed as soon as its corresponding signal call has been initiated, and means for each car, controlled at the despatcher's station, for preventing the car operator from receiving signals from some of the floors.

24. In an elevator signaling system, the combination of a movable car, a despatcher's signal board, despatcher's annunciator signals on said board, passengers' floor signals, a passenger's stop signal in the car, and means for making said passenger's floor signals and stop signal potentially operative at any time to result in the active energization of the signals when the car approaches a given floor, and means for causing the annunciator signals to automatically appear at the time the passengers' floor signals and the passengers' stop signal are made potentially operative.

25. In an elevator signaling system, the combination with an elevator car, of passengers' floor signals, a passenger's stop signal in the car, a supervisory despatch-board, annunciator signals on the despatch-board, means operative to render the passengers' signals potentially operative at any time for either "up" or "down" direction and by the same operation of said means cause an annunciator signal to appear and remain as a permanent record on the despatch-board until the stop signal has been attended to by a car operator.

26. In electric signaling apparatus for elevators, the combination with elevator cars, of signaling means comprising a despatch board having separate devices for receiving signals, sending signals, and verifying signals sent, passengers' floor switches, magnets energized by means of said switches, means for indicating upon the despatch-board which of said floor switches are operated and thereby including the demand for elevator service, car signals operatively associated with said switches for receiving notice of such demand when said magnets are energized, and a restoring magnet to restore the signal system to its normal condition when the said demand receives attention from a car operator.

27. In an elevator signal apparatus in combination, a plurality of cars, signals for the cars to stop at the floors, up and down signaling means corresponding to each floor and operated by the intending passengers for initiating up and down calls, a despatcher's station having for each car means controlled by the movement of that car only and indicating the position and direction of movement of that car together with an up and a down indicator corresponding to each floor and each displayed as soon as its corresponding signal call has been initiated, means whereby the cars may run past some of the floors without canceling the initiated call, and means for each car, controlled at the despatcher's station, for indicating to its operator to run his car past some of the floors from which signals have been initiated.

28. In an elevator signaling apparatus in combination, a plurality of cars, signals for the cars to stop at the floors, up and down signaling means corresponding to each floor and operated by the intending passengers for initiating up and down calls, a despatcher's station having for each car means controlled by the movement of that car only and indicating the position and direction of movement of that car together with an up and a down indicator, corresponding to each floor and each displayed as soon as the corresponding signal call has been initiated at any floor, and means for each car, controlled at the despatcher's station, for indicating to its operator to run his car past some of the floors from which signals have been initiated.

29. In an elevator signal apparatus in combination, a plurality of cars, signals for the cars to stop at the floors, up and down signaling means corresponding to each floor and operated by the intending passengers for initiating up and down calls, a despatcher's station having for each car means controlled by the movement of that car only and indicating the position and direction of movement of that car together with an up and a down indicator corresponding to each floor and each displayed as soon as its corresponding signal call has been initiated, said car-position and floor-call indicators being grouped together, and means for each car, controlled at the despatcher's station, for indicating to its operator to run his car past some of the floors from which signals have been initiated.

30. In a signaling system for controlling elevator operation, the combination with elevator cars, of two interdependent signaling systems, one system comprising passengers' floor signals, passengers' car stop signals, and means for actuating the same, the other system comprising a supervisory station, despatcher's express signals in the cars, car operators' express signals on the despatcher's supervisory board, and means whereby the several car operators may operate the car operator's express signals and the despatcher may operate the express signals in the car.

31. In a signaling system for controlling elevator operation, the combination with elevator cars, of passengers' floor signals and circuit operating means therefor, a car stop signal in each car and circuit operating means therefor, a supervisory station, circuit controlling means at said supervisory station adapted to be operated by a despatcher, circuit controlling means in each car adapted to be operated by the car operator of that car, and means whereby either said despatcher or said car operator may, independently of the other, cut out the floor signaling means and the car stop signaling means of any particular car, and also whereby said despatcher and car operator may, independently of the other, restore the operation of said floor signaling means and the car stop signaling means.

32. In a signaling system for controlling elevator operation, the combination with elevator cars, of passengers' floor signals and circuit operating means therefor, a car stop signal in each car and circuit operating means therefor, circuit controlling means for preventing the operation of both said circuits to permit the car to run express, and means automatically operated by the car when the car approaches the end of its run to restore said circuit operating means.

33. In a signaling system for controlling elevator operation, the combination with elevator cars running up and down elevator shafts, of passengers' floor signals and circuit operating means therefor, a car stop signal in each car and circuit operating means therefor, circuit controlling means for preventing the operation of said circuits to permit the car to run express, and means automatically operated by the car when it approaches the bottom of the shaft to restore said circuit operating means.

34. In a signaling system for controlling elevator operation, the combination with elevator cars running up and down elevator shafts, of passengers' floor signals and circuit operating means therefor, car stop signals in each car and circuit operating means therefor, a supervisory station, circuit controlling means at said supervisory station adapted to be operated by a despatcher for cutting out said passenger floor signals, and the car stop signal for any particular car to permit that car to run express, and means automatically operated by that car as it approaches the bottom of its shaft to restore the circuit operating means for the passenger's floor signals and the circuit operating means for the car stop signal.

In testimony whereof, I have signed my name to this specification in the presence of two subscribing witnesses.

AUGUST ANDRÉN.

Witnesses:
ERLE L. AUSTELL,
W. H. BRADY.